United States Patent
Srinivasan et al.

(10) Patent No.: US 7,848,540 B2
(45) Date of Patent: *Dec. 7, 2010

(54) METHODS AND APPARATUS FOR EMBEDDING AND RECOVERING AN IMAGE FOR USE WITH VIDEO CONTENT

(75) Inventors: Venugopal Srinivasan, Palm Harbor, FL (US); Dan Nelson, Tampa, FL (US); Arun Ramaswamy, Tampa, FL (US)

(73) Assignee: The Neilson Company (US), LLC, Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/816,366

(22) Filed: Jun. 15, 2010

(65) Prior Publication Data

US 2010/0246883 A1 Sep. 30, 2010

Related U.S. Application Data

(63) Continuation of application No. 11/363,765, filed on Feb. 28, 2006, now Pat. No. 7,742,618, which is a continuation of application No. PCT/US03/32240, filed on Oct. 10, 2003.

(60) Provisional application No. 60/498,884, filed on Aug. 29, 2003.

(51) Int. Cl.
*G06K 9/00* (2006.01)
*G06K 9/36* (2006.01)
(52) U.S. Cl. ........................................ 382/100; 382/276
(58) Field of Classification Search ................. 382/100, 382/276–282
See application file for complete search history.

(56) References Cited

U.S. PATENT DOCUMENTS

| 4,547,804 | A | 10/1985 | Greenberg |
| 4,805,020 | A | 2/1989 | Greenberg |
| 4,969,041 | A | 11/1990 | O'Grady et al. |
| 4,972,480 | A | 11/1990 | Rosen |
| 5,539,471 | A | 7/1996 | Myhrvold et al. |
| 5,651,065 | A | 7/1997 | Stufflet et al. |

(Continued)

FOREIGN PATENT DOCUMENTS

EP  0903943  3/1999

(Continued)

OTHER PUBLICATIONS

"Audio & Multimedia Watermarking", Fraunhofer IIS—Audio & Multimedia—Watermarking, http://www.iis.fraunhofer.de/amm/techinf/water, 7 pages.

(Continued)

*Primary Examiner*—Wesley Tucker
(74) *Attorney, Agent, or Firm*—Hanley, Flight & Zimmerman LLC

(57) ABSTRACT

Methods and apparatus for embedding and recovering an image for use with video content are disclosed. An example apparatus includes an image processing module to embed a real component of a spectral representation of the image data into a first set of video frames from the plurality of video frames and embed an imaginary component of the spectral representation of the image data into a second set of video frames from the plurality of video frames.

27 Claims, 4 Drawing Sheets

U.S. PATENT DOCUMENTS

| | | | |
|---|---|---|---|
| 5,668,603 A | 9/1997 | Copeland | |
| 5,768,426 A | 6/1998 | Rhoads | |
| 5,808,689 A | 9/1998 | Small | |
| 5,850,481 A | 12/1998 | Rhoads | |
| 5,929,920 A | 7/1999 | Sizer et al. | |
| 5,930,369 A | 7/1999 | Cox et al. | |
| 5,977,962 A | 11/1999 | Chapman et al. | |
| 6,026,193 A | 2/2000 | Rhoads | |
| 6,064,748 A | 5/2000 | Hogan | |
| 6,069,665 A | 5/2000 | Ikeda et al. | |
| 6,205,249 B1 | 3/2001 | Moskowitz | |
| 6,208,735 B1 | 3/2001 | Cox et al. | |
| 6,215,526 B1 | 4/2001 | Barton et al. | |
| 6,219,634 B1 | 4/2001 | Levine | |
| 6,246,796 B1 | 6/2001 | Horikoshi et al. | |
| 6,252,631 B1 | 6/2001 | Lakhani | |
| 6,266,096 B1 | 7/2001 | Gutsmann et al. | |
| 6,272,176 B1 | 8/2001 | Srinivasan | |
| 6,278,791 B1 * | 8/2001 | Honsinger et al. | 382/100 |
| 6,297,771 B1 | 10/2001 | Gronemeyer | |
| 6,339,449 B1 | 1/2002 | Ikeda et al. | |
| 6,343,181 B1 | 1/2002 | Ikeda et al. | |
| 6,363,159 B1 | 3/2002 | Rhoads | |
| 6,367,968 B1 | 4/2002 | Ringermacher et al. | |
| 6,373,960 B1 | 4/2002 | Conover et al. | |
| 6,385,329 B1 | 5/2002 | Sharma et al. | |
| 6,388,712 B1 | 5/2002 | Shinohara et al. | |
| 6,400,767 B1 | 6/2002 | Nuber et al. | |
| 6,400,827 B1 | 6/2002 | Rhoads | |
| 6,411,725 B1 | 6/2002 | Rhoads | |
| 6,449,379 B1 | 9/2002 | Rhoads | |
| 6,493,457 B1 | 12/2002 | Quackenbush et al. | |
| 6,529,506 B1 | 3/2003 | Yamamoto et al. | |
| 6,542,620 B1 | 4/2003 | Rhoads | |
| 6,574,350 B1 | 6/2003 | Rhoads et al. | |
| 6,590,996 B1 | 7/2003 | Reed et al. | |
| 6,642,966 B1 | 11/2003 | Limaye | |
| 6,983,058 B1 * | 1/2006 | Fukuoka et al. | 382/100 |
| 2002/0001394 A1 * | 1/2002 | Taniguchi et al. | 382/100 |
| 2002/0085736 A1 | 7/2002 | Kalker et al. | |
| 2002/0085737 A1 | 7/2002 | Kitamura | |
| 2002/0087864 A1 | 7/2002 | Depovere et al. | |
| 2002/0110280 A1 | 8/2002 | Prakash et al. | |
| 2003/0009101 A1 | 1/2003 | Sunagawa et al. | |
| 2003/0012402 A1 * | 1/2003 | Ono | 382/100 |
| 2003/0123660 A1 | 7/2003 | Fletcher et al. | |
| 2003/0128861 A1 | 7/2003 | Rhoads | |
| 2004/0030899 A1 * | 2/2004 | Lee et al. | 713/176 |
| 2004/0086197 A1 * | 5/2004 | Fletcher et al. | 382/276 |

FOREIGN PATENT DOCUMENTS

| | | |
|---|---|---|
| WO | 9837513 | 8/1998 |
| WO | WO 99/63443 | 12/1999 |
| WO | WO 00/22605 | 4/2000 |
| WO | WO 00/28736 | 5/2000 |
| WO | WO 02/17214 | 2/2002 |
| WO | WO 02/060182 | 8/2002 |

OTHER PUBLICATIONS

International Search Report for Patent Application Serial No. PCT/US03/32240; Apr. 6, 2004, 8 pages.

International Preliminary Examination Report, issued in PCT/US03/32240, mailed May 18, 2010, 5 pages.

Notice of Allowance, issued in U.S. Appl. No. 11/363,765, mailed Feb. 8, 2010, 7 pages.

* cited by examiner

US 7,848,540 B2

METHODS AND APPARATUS FOR EMBEDDING AND RECOVERING AN IMAGE FOR USE WITH VIDEO CONTENT

RELATED APPLICATION

This patent is a continuation of U.S. Pat. No. 7,742,618, filed Feb. 28, 2006, entitled "METHODS AND APPARATUS FOR EMBEDDING AND RECOVERING AN IMAGE FOR USE WITH VIDEO CONTENT," which is a continuation of PCT patent application serial no. PCT/US03/32240, which claims priority from U.S. provisional application Ser. No. 60/498,884 filed Aug. 29, 2003, entitled "METHODS AND APPARATUS FOR WATERMARKING A VIDEO SEQUENCE," the disclosures of which are hereby incorporated by reference in their entirety.

FIELD OF THE DISCLOSURE

The present disclosure pertains to video watermarking and, more particularly, to methods and an apparatus for embedding and recovering an image for use with video content.

BACKGROUND

There are several applications that require an identification of an unknown set of video frames. For example, in the fields of advertisement broadcast verification and television audience metering, it is desirable to identify a program tuned by a tuner. While monitoring broadcast advertisements and/or program content, it would be useful to have unique identification information or codes embedded in the set of video frames. An example system that embeds codes in non-viewable portions of video is the Nielsen Media Research Automatic Monitoring Of Line-up System, (AMOL), which is disclosed in U.S. Pat. No. 4,025,851.

Many methods developed for analog television broadcasting may not be suitable for digital television (DTV). For example, in the AMOL system, codes are inserted into a vertical blanking interval of an analog National Television Standards Committee (NTSC) signal. In digital television, video information is transmitted as digital data streams, which do not provide a vertical blanking interval or its equivalent. Rules have been proposed by the Federal Communications Commission (FCC) for broadcasters to carry information that was previously carried by the analog NTSC signal in a digital Advanced Television Standards Committee (ATSC) bit stream. Close captioning is one type of data that will be inserted into the digital ATSC bit stream. However, due to steps a typical DTV bit stream undergoes during processing (e.g., compression), some of the data may be lost. One possible solution to the data loss problem is to embed identifiers in the form of images or watermarks in viewable video. However, to maintain picture quality, watermarks must be imperceptible to a human eye.

Considerable development effort has been directed to improving image watermarking techniques, especially for applications where the objective is to track ownership of video content. In these instances, the primary requirements for the embedded image or watermark are its robustness and its security features. The latter includes means for prevention of watermark modification or erasure by unauthorized users of content. Cox et al. describe these concepts in their recent publication "Digital Watermarking" Morgan Kaufman Publishers, San Diego, Calif. 2002.

DETAILED DESCRIPTION

Although the following discloses example systems, including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the following describes example systems, persons of ordinary skill in the art will readily appreciate that the examples are not the only way to implement such systems.

Figure 1:
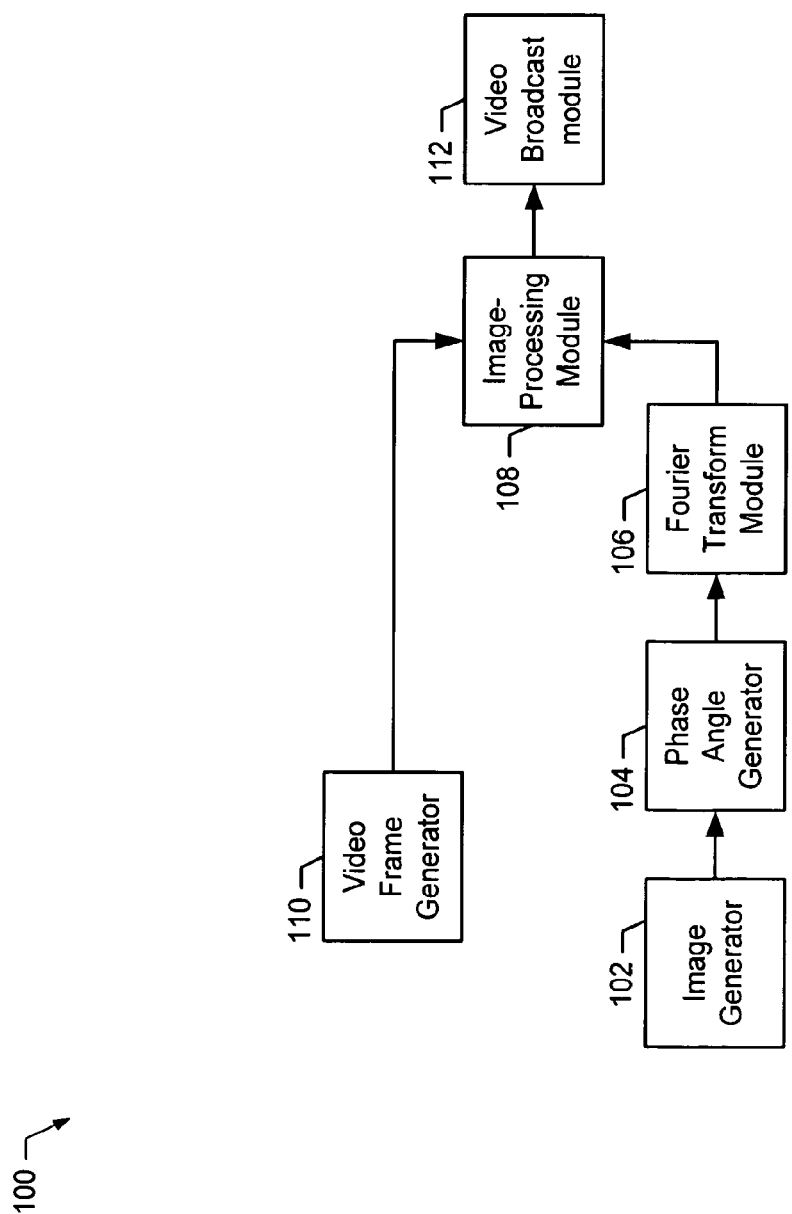
FIG. 1 is a block diagram of an example system for embedding an image into a set of video frames.

FIG. 1 is a block diagram of an example system 100 for embedding an image into a set of video frames. The system 100 may be implemented as several components of hardware, each of which is configured to perform one or more functions, may be implemented in software where one or more software programs are used to perform the different functions, or may be a combination of hardware and software. In this example, the system 100 includes an image generator 102, a phase angle generator 104, a Fourier transform module 106, an image-processing module 108, a video frame generator 110, and a video broadcast module 112.

The image generator 102 may be a device that selects an image to use as a watermark. The image generator 102 may select an image to be embedded from an image database, may allow the user to provide the image to be embedded, and/or may generate one or more images to be used as the embedded image or watermark. The image to be embedded (e.g., the watermark) may contain coded data. For example, the image generator 102 may generate a two dimensional bar code that may be used for identification and/or that may provide information (e.g., identification information) regarding video content.

The phase angle generator 104 may be a device that generates random phase angles and associates the random phase angles with pixels of the image(s) to be embedded generated by the image generator 102. The random phase angles may be selected from a uniform distribution of phase angles in the range of $(-\pi, \pi)$. However, other distributions (e.g., non-uniform distributions) could be used instead. In any case, the random phase angles may be associated with each pixel of the image or images to be embedded provided by the image generator 102 or may be associated with each pixel in a portion of the embedded image or images to be embedded.

The Fourier transform module 106 applies a two-dimensional Fourier transform to the image to be embedded (e.g., a watermark). In particular, the Fourier transform module 106 produces a spectral representation of the randomized image or images provided by the image generator 102 and the phase angle generator 104. Persons of ordinary skill in the art will appreciate that the two-dimensional Fourier transform is well known in the art and there are several manners in which the Fourier transform module 106 may be implemented.

The video frame generator 110 generates a set of video frames that may be viewed on a television set or on any other video display unit. The video frame generator 110 may be any device and/or software that produces video frames including, for example, the equipment that is typically used in producing video encoded to Motion Picture Expert Group (MPEG) standards and/or to DTV broadcast standards. The set of video frames may be a sequence of sequential or consecutive video frames that have inter-frame pixel differences below a predetermined threshold. As described in greater detail below, selecting video frames having smaller inter-frame pixel differences facilitates the recovery of embedded images (e.g., coded images) or watermarks.

The image-processing module 108 receives a spectral representation of an image to be embedded from the Fourier transform module 106 and a set of video frames from the video frame generator 110. The image processing module 106 is configured to manipulate and/or process the spectral representations of the image to be embedded and the set of video frames. The image-processing module 108 may have capabilities including, but not limited to, conditioning the spectral representation of the image to be embedded, separating the spectral representation of the image to be embedded into a real component and an imaginary component, and embedding the spectral representation of the image to be embedded in the set of video frames. The image-processing module 108 may be implemented using the processor 506 of FIG. 5, the processor system 500 of FIG. 5, and/or one or more software programs.

The video broadcast module 112 is configured to transmit the video frames (some of which may contain embedded images or watermark information) to a viewing audience. The video broadcast module 112 may be any type of well-known broadcast system such as digital television or a satellite television system such as DIRECTV®. The video broadcast module 112 may transmit the video frames through wires (e.g. coaxial cable) and/or through a wireless transmission network.

Figure 2:
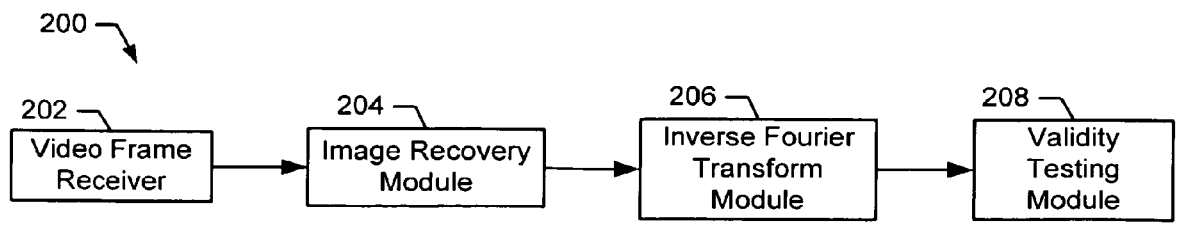
FIG. 2 is a block diagram of an example system to recover an embedded image from a set of video frames.

FIG. 2 is a block diagram of an example system 200 that may be used to recover an embedded image (e.g., a watermark) from a set of video frames. The system 200 may be implemented using several components of hardware, each of which is configured to perform one or more functions, may be implemented in software where one or more software programs are used to perform the different functions, or may be a combination of hardware and software. The system 200 includes a video frame receiver 202, an image recovery module 204, an inverse Fourier transform module 206, and a validity testing module 208.

The video frame receiver 202 is configured to receive video frames transmitted by the video broadcast module 112 of FIG. 1. The video frame receiver 202 may be implemented as a set-top box, a cable tuner internal to a television set, and/or a satellite dish with its accompanying converter box. The video frame receiver 202 receives video frames and may process (e.g., may decode, demultiplex, decrypt, etc.) the video frames to be presented on a television or some other video display device. The video frame receiver 202 may also be configured to output the video frames before the frames have been fully or partially processed.

The image recovery module 204 is configured to process video frames and to recover a spectral representation of an embedded image. The image recovery module 204 may have capabilities such as, but not limited to, buffering video frames, dividing the set of video frames into smaller sets of video frames and calculating a difference between video frames. The image recovery module 204 may be implemented using a system similar or identical to the processor system 500 of FIG. 5 and/or one or more software programs.

The inverse Fourier transform module 206 is configured to apply an inverse Fourier transform to the spectral representation of a recovered embedded image to form the recovered embedded image. Persons of ordinary skill in the art will appreciate that methods for implementing the inverse Fourier transform module 206 are well known in the art and, thus, are not described in greater detail herein.

The validity testing module 208 is configured to receive a recovered image (e.g., an embedded image, a watermark image and/or an image coded with data) and test the recovered image for validity. The recovered image may be tested by comparing the recovered image to a database of images, decoding the recovered image, and/or retrieving embedded codes from within the recovered image.

Figure 3:
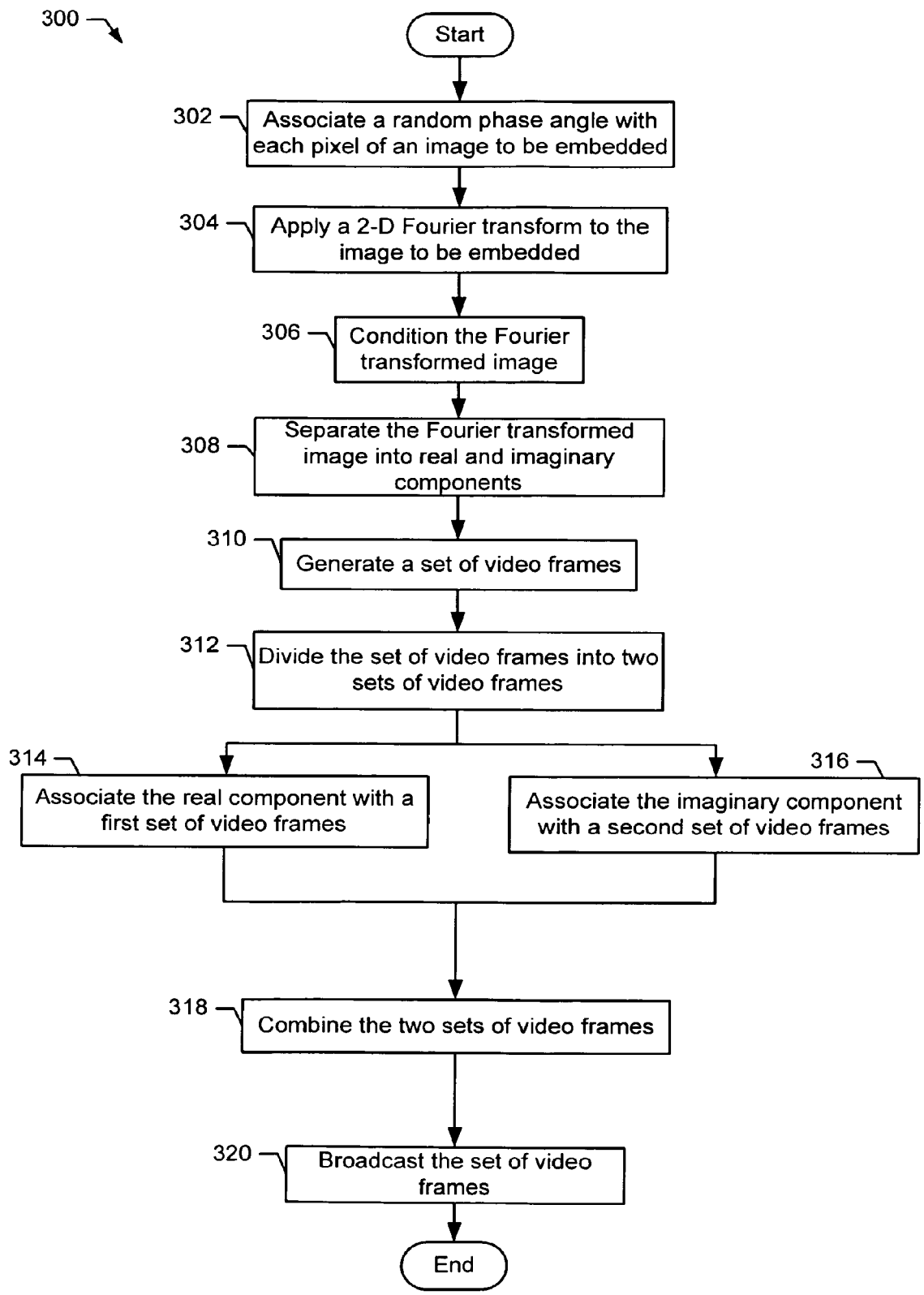
FIG. 3 is a flowchart depicting an example manner in which the system of FIG. 1 may be configured to embed an image within a set of video frames.

FIG. 3 is a flowchart depicting an example manner in which the system of FIG. 1 may be configured to embed an image into a set of video frames. Preferably, but not necessarily, the illustrated process 300 is embodied in one or more software programs, which are stored in one or more memories (e.g., flash memory 512 of FIG. 5 and/or hard disk 520 of FIG. 5), and executed by one or more processors (e.g., processor 506 of FIG. 5) in a well-known manner. However, some or all of the blocks of the process 300 may be performed manually and/or by some other device. Although the example process 300 is described with reference to the flowchart illustrated in FIG. 3, a person of ordinary skill in the art will readily appreciate that many other methods of performing the process 300 may be used. For example, the order of many of the blocks may be altered, the operation of one or more blocks may be changed, blocks may be combined, and/or blocks may be eliminated.

In general, the example process 300 embeds an image into a set of video frames. More specifically, the Fourier transform module 106 transforms the image to be embedded into a spectral representation of the image via a Fourier transform and the transformed image is separated into a real and an imaginary component by the image-processing module 108. A set of video frames is generated by the video frame generator 110 and divided into two sets of video frames using the image processing module 108. The real and imaginary components of the spectral representation of the image to be embedded are then inserted into the two sets of video frames. The two sets of video frames are then combined and the resulting set of video frames is then transmitted by the video broadcast module 112.

Now turning in detail to FIG. 3, the example process 300 begins when the phase angle generator 104 associates random phase angles to pixels in an image to be embedded (e.g., P(m,n)) to spread the spectrum of the image to be embedded uniformly across a broad band of spatial frequencies (block 302). The phase angle generator 104 randomly selects phase angles from a uniform distribution of phase angles in the range of $(-\pi, \pi)$. A random phase angle and/or a plurality of random phase angles may be associated with each pixel of the image to be embedded or with each pixel of a selected portion of the image to be embedded. One example method to associate a random phase angle, $\phi(m,n)$, to a pixel is to multiply the pixel by the complex exponential representation of the random phase angle (e.g., $P(m,n)e^{j\phi(m,n)}$). After the random phase angles have been associated with the image to be embedded, the image to be embedded is then generally referred to as the randomized image, $P_R(m,n)$.

The example process 300 then uses the Fourier transform module 106 to apply a two-dimensional Fourier transform to the randomized image (block 304), which forms a spectral representation of the randomized image, (e.g., $F_R(u,v)=a_R(u,v)+jb_R(u,v)$, where $a_R(u,v)$ is a real component of the spectral representation of the randomized image and $b_R(u,v)$ is the imaginary component of the spectral representation of the randomized image).

The spectral representation of the randomized image may then be conditioned by the image-processing module 106 (block 306). Conditioning of the spectral representation of the randomized image may include, but is not limited to, scaling by a gain factor, normalizing, or quantizing into a predetermined number of levels. One example method to normalize the spectral representation of the randomized image is to calculate the maximum amplitude of the spectral representation of the randomized image, $F_{max}$, and then divide the real component and the imaginary component by $$F_{max}\left(e.g., a_N(u,v) = \frac{a_R(u,v)}{F_{max}} \text{ and } b_N(u,v) = \frac{b_R(u,v)}{F_{max}}\right).$$

The spectral representation of the randomized image is then separated into the real component and the imaginary component by the image processing module 108 (block 308).

The process 300 continues when the video frame generator 110 generates a first set of video frames (e.g., $V_0(u,v)$, $V_1(u,v)$, $V_2(u,v)$, $V_3(u,v)$) (block 310). The first set of video frames may be frames of a digital television broadcast and/or any other digital video broadcast or transmission and may include a sequence of video frames with relatively little pixel variation between consecutive frames. The process 300 may filter the video frames so that only successive video frames with relatively little pixel variation are used in the process 300. Although the above example of the first set of video frames uses four video frames, the number of video frames used may be fewer than or more than four.

The first set of video frames is then divided into smaller sets of video frames by the image-processing module 108 (block 312). In one example implementation, the first set of video frames, $V_0(u,v)$, $V_1(u,v)$, $V_2(u,v)$, $V_3(u,v)$, is separated into a second set of video frames, $V_0(u,v)$, $V_1(u,v)$, and a third set of video frames, $V_2(u,v)$, $V_3(u,v)$. The video frames may be separated so that there are no overlapping video frames between the two sets.

The image-processing module 108 then embeds the real component and the imaginary component of the spectral representation of the randomized image into the second set of video frames and the third set of video frames, respectively (blocks 314 and 316). An example method to implement the embedding of the real and imaginary components of the spectral representation of the randomized image is set forth below $$V_0 \rightarrow V_{0W} = V_0(u,v) + a_{NQ}(u,v)$$

$$V_1 \rightarrow V_{1W} = V_1(u,v) - a_{NQ}(u,v)$$

$$V_2 \rightarrow V_{2W} = V_2(u,v) + b_{NQ}(u,v)$$

$$V_3 \rightarrow V_{3W} = V_3(u,v) - b_{NQ}(u,v)$$

The subscript W denotes a frame into which image information or data has been embedded (e.g., watermarked) and the subscript Q denotes a quantized value. The quantized values may be obtained by multiplying the normalized values of the real and imaginary components of the spectral representation of the randomized image by an integer scaling factor. Typical values for the integer scaling factor are 4 or 8. The two sets of frames into which image information or data has been embedded may be combined into a spectral representation of a single set of video frames (e.g., $V_{0W}(u,v)$, $V_{1W}(u,v)$, $V_{2W}(u,v)$, $V_{3W}(u,v)$) (block 318).

The video frames containing the embedded image information or data are then broadcast or otherwise conveyed to a viewing audience by the video broadcast module 112 (block 322). One example method to broadcast the video frames containing the embedded image data is to transmit the video frames using equipment that is typically used in a digital television broadcast system. After the video frames are broadcast, the process 300 ends.

Figure 4:
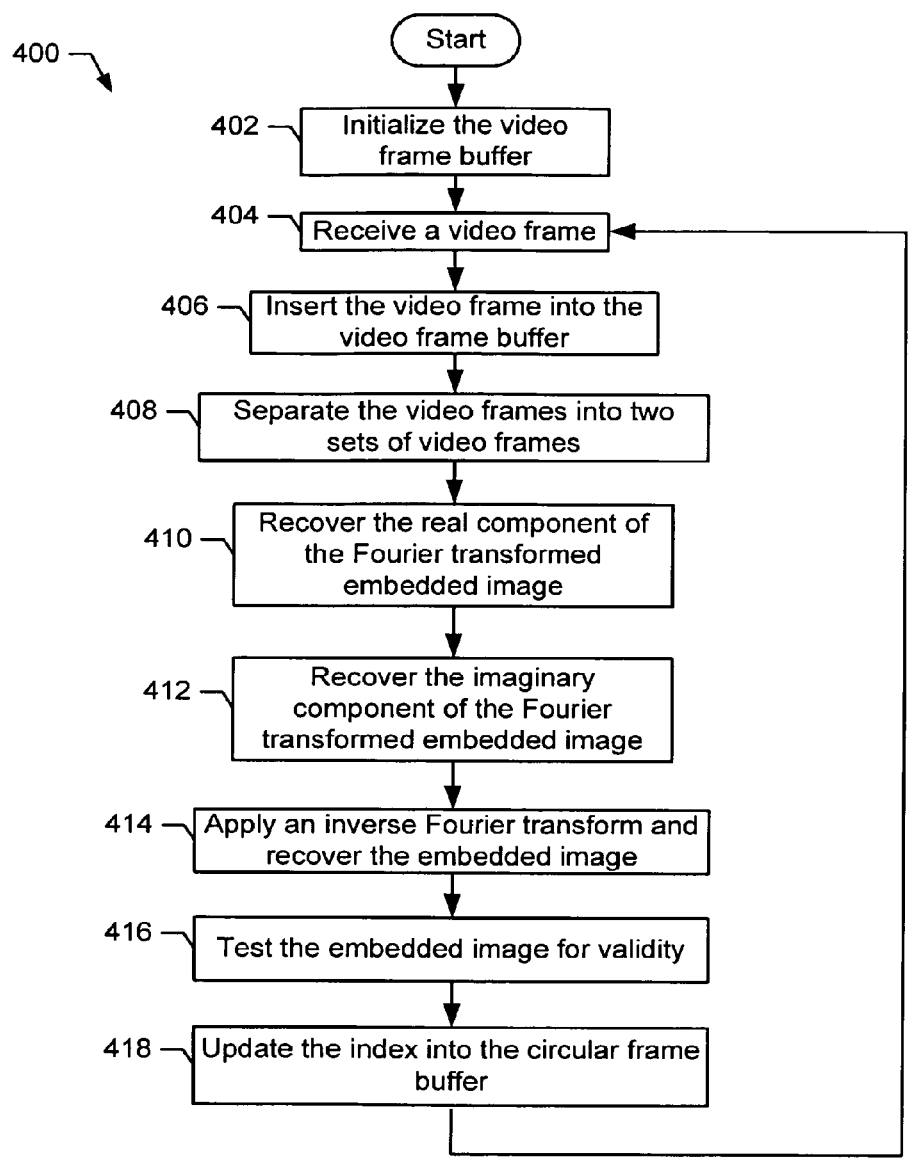
FIG. 4 is a flowchart depicting an example manner in which the system of FIG. 2 may be configured to recover an embedded image from a set of video frames.

FIG. 4 is a flowchart depicting an example manner in which the system of FIG. 2 may be configured to recover an embedded image from a set of video frames. Preferably, but not necessarily, the illustrated process 400 is embodied in one or more software programs, which are stored in one or more memories (e.g., flash memory 512 of FIG. 5 and/or hard disk 520 of FIG. 5), and executed by one or more processors (e.g., processor 506 of FIG. 5) in a well-known manner. However, some or all of the blocks of the process 400 may be performed manually and/or by some other device. Although the process 400 is described with reference to the flowchart illustrated in FIG. 4, a person of ordinary skill in the art will readily appreciate that many other methods of performing the process 400 may be used. For example, the order of many of the blocks may be altered, the operation of one or more blocks may be changed, blocks may be combined, and/or blocks may be eliminated.

The example process 400 begins by initializing a video frame buffer within the image processing module 204 (block 402). The video frame buffer may be implemented as a circular video frame buffer within the image recovery module 204. A person of ordinary skill in the art will readily appreciate the use of a circular video frame buffer and different methods to implement a circular video frame buffer. In the case that a circular video frame buffer is used, the buffer may be initialized such that the all video frames within the buffer contain a constant value such as 0.

The example process then receives a new video frame at the video frame receiver 202 (block 404). The video frame receiver 202 may receive the video frames from a coaxial cable, satellite equipment, over-the-air broadcast, and/or via any other manner. The video frame may be processed by the video frame receiver 202 and displayed for the viewing audience, and/or the video frame may be passed to the image recovery module 204.

The image recovery module 204 receives the new video frame and inserts the new video frame into a video frame buffer (block 406). The image recovery module 204 forms a first set of video frames from the video frames within the circular video frame buffer (e.g., $V_{0W}(u,v)$, $V_{1W}(u,v)$, $V_{2W}(u,v)$, $V_{3W}(u,v)$).

The first set of video frames derived from the circular video buffer is then separated into two sets of video frames (block 408). One example implementation is to separate the first set of video frames into a second set of video frames (e.g., $V_{0W}(u,v)$, $V_{1W}(u,v)$) and a third set of video frames (e.g., $V_{2W}(u,v)$, $V_{3W}(u,v)$). The first set of video frames may be separated so that the sets do not have any common video frames.

After the set of video frames is separated, the image recovery module 204 recovers the real component of the spectral representation of the embedded image from the second set of video frames and the imaginary component of the embedded image from the third set of video frames (blocks 410 and block 412). One example method to recover the real and imaginary component of the spectral representation of the embedded image is to calculate the difference between video frames. For example, the real component of the spectral representation of the embedded image may be recovered by performing the operation $a_{NQ}(u, v) = V_{0W}(u, v) - V_{1W}(u, v)$, and the imaginary component of the spectral representation of the embedded image may be recovered by performing the operation $b_{NQ}(u, v) = V_{2W}(u, v) - V_{3W}(u, v)$. The real component and the imaginary component of the spectral representation of the embedded image are then combined. The inverse Fourier transform module 206 then applies an inverse Fourier transform to recover the embedded image (block 414).

The recovered embedded image is then tested for validity by the validity testing module 208 (block 416). The validity testing module 208 may test for validity by comparing the recovered embedded image to images in an image database, recovering codes embedded within the embedded image, and/or decoding the embedded image. One example method of testing for validity of the recovered embedded image (e.g., a two-dimensional bar code) is to use an error correction and detection method such as a Reed-Solomon process. Correction and detection based on a Reed-Solomon process is well known and, thus, is not described in greater detail herein.

After the recovered embedded image has been tested (block 416), the process 400 updates a circular video frame buffer index variable such that the oldest entry in the circular video frame buffer is overwritten by a new video frame received by the image processing module 204. The example process 400 continues to receive video frames and insert the received video frames into the circular video frame buffer (block 404).

Figure 5:
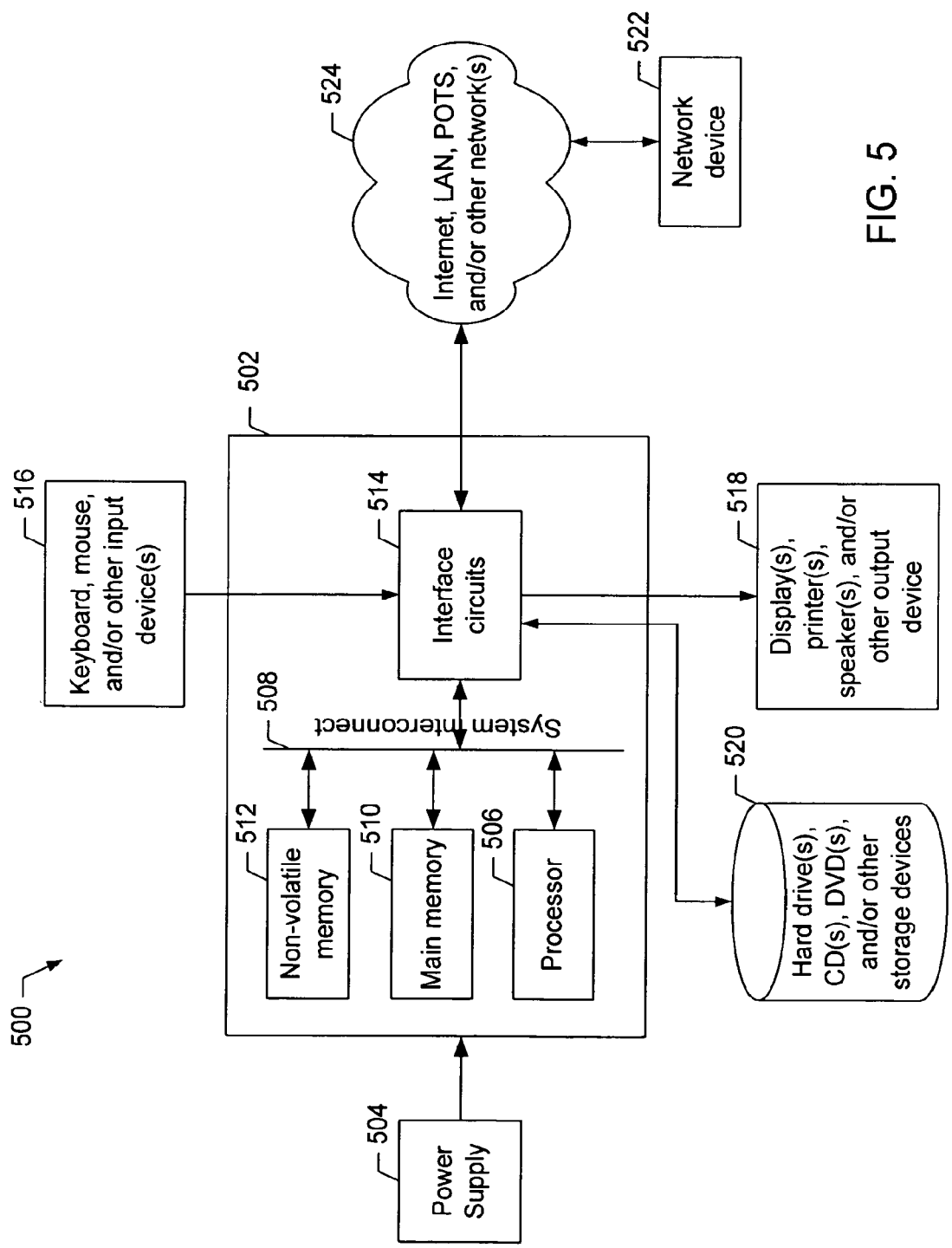
FIG. 5 is a block diagram of an example processor system that may be used to implement the methods and apparatus disclosed herein.

FIG. 5 is a block diagram of an example processor system that may be used to implement the methods and apparatus disclosed herein. The computer system 500 may be a personal computer (PC) or any other computing device. In the example illustrated, the computer system 500 includes a main processing unit 502 powered by a power supply 504. The main processing unit 502 may include a processor 506 electrically coupled by a system interconnect 508 to a main memory device 150, a flash memory device 512, and one or more interface circuits 514. In an example, the system interconnect 508 is an address/data bus. Of course, a person of ordinary skill in the art will readily appreciate that interconnects other than busses may be used to connect the processor 506 to the other devices 510, 512, and 514. For example, one or more dedicated lines and/or a crossbar may be used to connect the processor 506 to the other devices 510, 512, and 514.

The processor 506 may be any type of well known processor, such as a processor from the Intel Pentium® family of microprocessors, the Intel Itanium® family of microprocessors, the Intel Centrino® family of microprocessors, the Intel XScale® family of microprocessors, and/or any type of Digital Signal Processor (DSP). In addition, the processor 506 may include any type of well known cache memory, such as static random access memory (SRAM). The main memory device 510 may include dynamic random access memory (DRAM) and/or any other form of random access memory. For example, the main memory device 510 may include double data rate random access memory (DDRAM). The main memory device 510 may also include non-volatile memory. In an example, the main memory device 510 stores a software program which is executed by the processor 506 in a well known manner. The flash memory device 512 may be any type of flash memory device. The flash memory device 512 may store firmware used to boot the computer system 500.

The interface circuit(s) 514 may be implemented using any type of well known interface standard, such as an Ethernet interface and/or a Universal Serial Bus (USB) interface. One or more input devices 516 may be connected to the interface circuits 514 for entering data and commands into the main processing unit 502. For example, an input device 516 may be a keyboard, mouse, touch screen, track pad, track ball, isopoint, and/or a voice recognition system.

One or more displays, printers, speakers, and/or other output devices 518 may also be connected to the main processing unit 502 via one or more of the interface circuits 514. The display 518 may be a cathode ray tube (CRT), a liquid crystal displays (LCD), or any other type of display.

The computer system 500 may also include one or more storage devices 520. For example, the computer system 500 may include one or more hard drives, a compact disk (CD) drive, a digital versatile disk drive (DVD), and/or other computer media input/output (I/O) devices The computer system 500 may also exchange data with other devices 522 via a connection to a network 524. The network connection may be any type of network connection, such as an Ethernet connection, digital subscriber line (DSL), telephone line, coaxial cable, etc. The network 524 may be any type of network, such as the Internet, a telephone network, a cable network, and/or a wireless network. The network devices 522 may be any type of network devices 522. For example, the network device 522 may be a client, a server, a hard drive, etc.

Although the above discloses example systems including, among other components, software executed on hardware, it should be noted that such systems are merely illustrative and should not be considered as limiting. For example, it is contemplated that any or all of the disclosed hardware and software components could be embodied exclusively in dedicated hardware, exclusively in software, exclusively in firmware or in some combination of hardware, firmware and/or software.

In addition, although certain methods, apparatus, and articles of manufacture have been described herein, the scope of coverage of this patent is not limited thereto. On the contrary, this patent covers all apparatuses, methods and articles of manufacture fairly falling within the scope of the appended claims either literally or under the doctrine of equivalents.

What is claimed is:

1. An apparatus to embed image data within a plurality of video frames comprising:
    an image processing module to use a processor to:
        embed a real component of a spectral representation of the image data into a first set of video frames from the plurality of video frames; and
        embed an imaginary component of the spectral representation of the image data into a second set of video frames from the plurality of video frames.

2. An apparatus as defined in claim 1, wherein the image processing module is to:
    combine the first set of video frames from the plurality of video frames with the second set of video frames from the plurality of video frames to form a third set of video frames from the plurality of video frames.

3. An apparatus as defined in claim 1, further comprising:
    a random phase angle generator to associate at least one random phase angle from a plurality of random phase angles to each pixel in the image data to form randomized image data;

a Fourier transform module to apply a two-dimensional Fourier transform to the randomized image data to form a spectral representation of the randomized image data; and a video broadcast module to transmit the third set of video frames from the plurality of video frames.

4. An apparatus as defined in claim 1, wherein the image processing module is to condition the spectral representation of the image data.

5. An apparatus as defined in claim 4, wherein the image processing module is to condition the spectral representation of the image data using at least one of a scaling operation, a normalizing operation, and a quantizing operation.

6. An apparatus as defined in claim 1, wherein the image processing module is to embed the real component of the spectral representation of the image data in the first set of video frames using at least one of an addition operation and a subtraction operation.

7. An apparatus as defined in claim 1, wherein the image processing module is to embed the imaginary component of the spectral representation of the image data in the second set of video frames using at least one of an addition operation and a subtraction operation.

8. An apparatus to recover image data from a plurality of video frames comprising:
a image recovery module to use a processor to:
recover a real component of a spectral representation of the image data from a first set of video frames from the plurality of video frames;
recover an imaginary component of the spectral representation of the image data from a second set of video frames from the plurality of video frames; and
recover the image data based on the real component of the spectral representation of the image data and the imaginary component of the spectral representation of the image data.

9. An apparatus as defined in claim 8, wherein the image recovery module is to:
store video frames in a video frame buffer;
form the plurality of video frames from the video frames within the video frame buffer.
separate the plurality of video frames into the first set of video frames and the second set of video frames.

10. An apparatus as defined in claim 8, wherein the image processing module is to recover the real component of the spectral representation of the image data from the first set of video frames by calculating a difference between two video frames from the first set of video frames.

11. An apparatus as defined in claim 8, wherein the image processing module is to recover the imaginary component of the spectral representation of the image data from the second set of video frames by calculating a difference between two video frames from the second set of video frames.

12. An apparatus as defined in claim 8, wherein the image recovery module is to combine the real component of the spectral representation of the image data with the imaginary component of the spectral representation of the image data to form the spectral representation of the image data.

13. An apparatus as defined in claim 8, further comprising:
a video receiver to receive the plurality of video frames; and
an inverse Fourier transform module to transform the spectral representation of the image data to form the image data.

14. An apparatus as defined in claim 13, further comprising a validity testing module to determine the validity of the image data.

15. A tangible computer readable medium having instructions stored thereon that, when executed, cause a machine to:
embed a real component of a spectral representation of image data into a first set of video frames from a plurality of video frames to form a modified first set of video frames; and
embed an imaginary component of the spectral representation of the image data into a second set of video frames from the plurality of video frames to form a modified second set of video frames.

16. A tangible computer readable medium as defined in claim 15 having instructions stored thereon that, when executed, cause the machine to:
associate at least one random phase angle from a plurality of random phase angles to each pixel of at least a portion of the image data to form randomized image data;
apply a two-dimensional Fourier transform to the randomized image data to form a spectral representation of the randomized image data; and
separate the plurality of video frames into the first set of video frames and the second set of video frames.

17. A tangible computer readable medium as defined in claim 16 having instructions stored thereon that, when executed, cause the machine to condition the spectral representation of the randomized image data.

18. A tangible computer readable medium as defined in claim 15 having instructions stored thereon that, when executed, cause the machine to embed the real component of the spectral representation of the image data into the first set of video frames using at least one of an addition operation and a subtraction operation.

19. A tangible computer readable medium as defined in claim 15 having instructions stored thereon that, when executed, cause the machine to embed the imaginary component of the spectral representation of the image data into the second set of video frames using at least one of an addition operation and a subtraction operation.

20. A tangible computer readable medium as defined in claim 15 having instructions stored thereon that, when executed, cause the machine to:
combine the modified first set of video frames and the modified second set of video frames to form the third set of video frames from the plurality of video frames; and
broadcast the third set of video frames.

21. A tangible computer readable medium having instructions stored thereon that, when executed, cause a machine to:
recover a real component of a spectral representation of the image data from a first set of video frames from the plurality of video frames;
recover an imaginary component of the spectral representation of the image data from a second set of video frames from the plurality of video frames; and
recover the image data based on the real component of the spectral representation of the image data and the imaginary component of the spectral representation of the image data.

22. A tangible computer readable medium as defined in claim 21 having instructions stored thereon that, when executed, cause the machine to recover the real component of the spectral representation of the image data from first set of video frames by calculating a difference between two video frames from the first set of video frames.

23. A tangible computer readable medium as defined in claim 21 having instructions stored thereon that, when executed, cause the machine to recover the imaginary component of the spectral representation of the image data from the second set of video frames by calculating a difference between of two video frames from the second set of video frames.

24. A tangible computer readable medium as defined in claim 21 having instructions stored thereon that, when executed, cause the machine to:

combine the real component of the spectral representation of the image data with the imaginary component of the spectral representation of the image data to form a spectral representation of the image data; and apply an inverse Fourier transform to the spectral representation of the image data to form the image data.

25. A tangible computer readable medium as defined in claim 21 having instructions stored thereon that, when executed, cause the machine to:

separate the plurality of video frames into the first set of video frames and the second set of video frames.

26. A tangible computer readable medium as defined in claim 21 having instructions stored thereon that, when executed, cause the machine to:

receive a video frame;

store the video frame in a video frame buffer until at least four video frames have been buffered;

form the plurality of video frames from the video frames within the video frame buffer; and remove an oldest video frame from the video frame buffer.

27. A tangible computer readable medium as defined in claim 26 having instructions stored thereon that, when executed, cause the machine to test the validity of the recovered image data.

* * * * *

UNITED STATES PATENT AND TRADEMARK OFFICE
CERTIFICATE OF CORRECTION

| | |
|---|---|
| PATENT NO. | : 7,848,540 B2 |
| APPLICATION NO. | : 12/816366 |
| DATED | : December 7, 2010 |
| INVENTOR(S) | : Venugopal Srinivasan, Dan Nelson and Arun Ramaswamy |

It is certified that error appears in the above-identified patent and that said Letters Patent is hereby corrected as shown below:

On the Title page, Item (73), Assignee: replace "Neilson" with --Nielsen--

Signed and Sealed this
Thirty-first Day of January, 2012

David J. Kappos
*Director of the United States Patent and Trademark Office*